(No Model.)
J. HARTMANN.
SAFETY ATTACHMENT FOR BRIDLES.
No. 421,401. Patented Feb. 18, 1890.
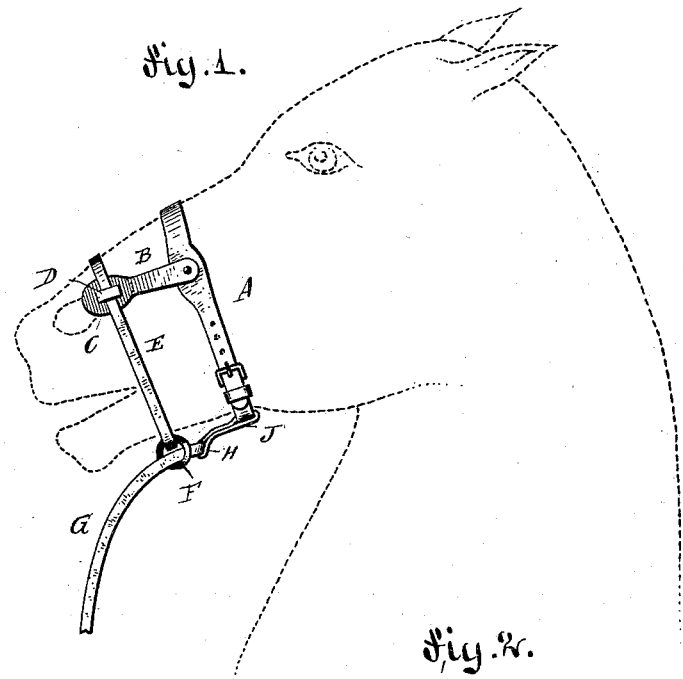
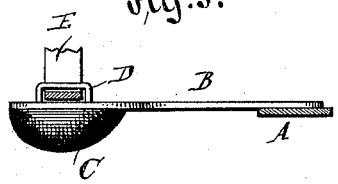
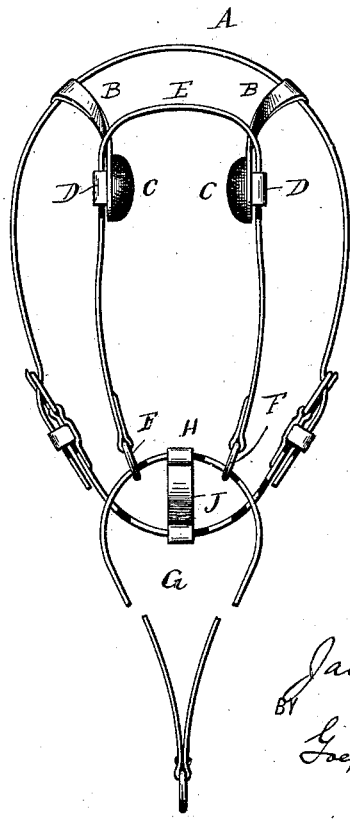
WITNESSES:
INVENTOR
Jacob Hartmann
BY
Goepel & Jaeger
ATTORNEYS.

UNITED STATES PATENT OFFICE.

JACOB HARTMANN, OF NEW YORK, N. Y.

SAFETY ATTACHMENT FOR BRIDLES.

SPECIFICATION forming part of Letters Patent No. 421,401, dated February 18, 1890.

Application filed October 19, 1889. Serial No. 327,532. (No model.)

*To all whom it may concern:*

Be it known that I, JACOB HARTMANN, of the city, county, and State of New York, a citizen of the Republic of Switzerland, have invented certain new and useful Improvements in Safety Attachments for Bridles, of which the following is a specification.

This invention relates to safety attachments for bridles for the purpose of controlling vicious or run-away horses.

The object of my invention is to provide an attachment of this kind by which the nostrils of the animal can be closed at will, thus compelling it to come to a standstill at once, for the reason that horses breathe through their nostrils, and when the latter are closed become docile and quiet, as they soon become aware that then the devices that are applied to cut off the air will be removed.

The invention consists in the construction and combination of parts and details, as will be fully described hereinafter, and finally pointed out in the claim.

In the accompanying drawings, Figure 1 shows my improved attachment in perspective view. Fig. 2 is a bottom view of the same. Fig. 3 is a detail sectional view showing one of the pads.

Similar letters of reference indicate corresponding parts.

The strap A is passed around the horse's nose about midway between the eyes and the end of the snout, and to said strap A two leather arms B are secured, which carry at their free ends and on the inner surfaces pads C, made of felt, leather, or other suitable material, which pads rest on the horse's nose directly above the nostrils. Each leather arm B is provided on its outer surface at the free end with a loop D, through which a strap E is passed, which is also passed around the animal's nose between the strap A and the end of the snout. The strap E is provided on its ends with rings F, and through said rings F a strap G is passed, which is also passed through a loop H, formed on the end of the short strap J on the main strap A. Said strap G is connected with a strap or rein, that extends to the driver's seat.

When the animal becomes vicious and unmanageable, the driver need only pull the strap G, whereby the strap E is applied tightly on the animal's nose, and the pads C are pressed into the soft fleshy part of the nose directly above the nostrils, thereby closing the air-passages in the animal's nose, and thus the animal can be effectually controlled.

Having thus described my invention, I claim as new and desire to secure by Letters Patent—

In a safety attachment for bridles, the combination, with the main strap A, of the flexible arms B, having pads C on the inner surfaces at the free ends, the straps E being passed through the loops D, formed on the arms B, the rings F, secured to the ends of the strap E, the strap J, fastened on the strap A and having the loop H on its end, and the strap G being passed through the rings F and the loop H, substantially as shown and described.

In testimony that I claim the foregoing as my invention I have signed my name in presence of two subscribing witnesses.

JACOB HARTMANN.

Witnesses;
  M. REIMERR,
  HENRY HUBER.